United States Patent
Miyanoo

(10) Patent No.: US 8,078,372 B2
(45) Date of Patent: Dec. 13, 2011

(54) OUTPUT CONTROL DEVICE FOR INTERNAL COMBUSTION ENGINE

(75) Inventor: Yuji Miyanoo, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 505 days.

(21) Appl. No.: 12/309,862

(22) PCT Filed: Aug. 9, 2007

(86) PCT No.: PCT/JP2007/065664
§ 371 (c)(1),
(2), (4) Date: Mar. 9, 2009

(87) PCT Pub. No.: WO2008/018568
PCT Pub. Date: Feb. 14, 2008

(65) Prior Publication Data
US 2009/0319137 A1    Dec. 24, 2009

(30) Foreign Application Priority Data
Aug. 11, 2006    (JP) .................................. 2006-220176

(51) Int. Cl.
*G06F 17/00* (2006.01)
(52) U.S. Cl. ............ 701/54; 701/51; 701/101; 701/103; 477/34; 123/681
(58) Field of Classification Search .................... 701/51, 701/52, 54, 84, 87, 101, 103; 477/34, 54, 477/183; 123/681
See application file for complete search history.

(56) References Cited

U.S. PATENT DOCUMENTS

| | | |
|---|---|---|
| 5,392,215 A | 2/1995 | Morita |
| 6,701,244 B2 * | 3/2004 | Oota et al. ..................... 701/104 |
| 2002/0098944 A1 | 7/2002 | Iriyama |
| 2004/0060349 A1 | 4/2004 | Brendle et al. |
| 2004/0230362 A1 | 11/2004 | Post, II et al. |

FOREIGN PATENT DOCUMENTS

| | | |
|---|---|---|
| DE | 10 2004 036 515 A1 | 3/2006 |
| EP | 1 388 660 A1 | 2/2004 |
| JP | A 6-58178 | 3/1994 |
| JP | A 6-64460 | 3/1994 |
| JP | A 8-218919 | 8/1996 |
| JP | A 9-287488 | 11/1997 |
| JP | A 2001-248487 | 9/2001 |

(Continued)

OTHER PUBLICATIONS

European Search Report for corresponding European Patent Application No. 07792311.8, mailed on Nov. 22, 2010.
Office Action issued in Japanese Patent Application No. 2009-208219 dated Jul. 19, 2011 (with translation).

*Primary Examiner* — Gertrude Arthur Jeanglaude
(74) *Attorney, Agent, or Firm* — Oliff & Berridge, PLC

(57) ABSTRACT

An electronic control unit 40 calculates a target output torque of an internal combustion engine 10 based on a manipulation amount of an accelerator pedal 60, a vehicle speed, and a state of a transmission gear ratio of an automatic continuously variable transmission 30, and calculates a target opening of a throttle valve 14 based on the calculated target output torque. If the current value of the transmission gear ratio of the automatic continuously variable transmission 30 is smaller than a predetermined value, the target opening of the throttle valve 14 calculated based on the target output torque is limited to be less than or equal to a preset upper limit.

6 Claims, 13 Drawing Sheets

FOREIGN PATENT DOCUMENTS

| JP | A-2002-39357 | 2/2002 |
| JP | A-2004-162574 | 6/2004 |
| JP | A 2005-504223 | 2/2005 |
| JP | A 2007-46502 | 2/2007 |

* cited by examiner

OUTPUT CONTROL DEVICE FOR INTERNAL COMBUSTION ENGINE

FIELD OF THE INVENTION

The present invention relates to an output control device for an internal combustion engine.

BACKGROUND OF THE INVENTION

There is known, as an output control for an internal combustion engine, a torque demand control for controlling an output torque of the internal combustion engine by calculating a target output torque of the internal combustion engine based on a driver's manipulation amount of an accelerator pedal and adjusting an intake air amount based on the target output torque.

For example, a control device disclosed in Patent Document 1 calculates a target drive shaft torque based on an accelerator manipulation amount and a vehicle speed, divides the target drive shaft torque by a final gear ratio, and calculates a target output shaft torque of a transmission. Furthermore, the control device divides the target output shaft torque by a torque doubling ratio set in the transmission and a torque converter to thereby calculate a target output torque of the internal combustion engine, and sets an opening degree of a throttle valve based on the target output torque and the rotational speed of the internal combustion engine.

As described in Patent Document 1, when the target output torque of the internal combustion engine is calculated in light of torque conversion in the transmission, the target output torque can be calculated to correspond to a transmission gear ratio of the transmission, that is, (rotational speed of an input shaft)/(rotational speed of an output shaft) of the transmission.

Patent Document 1: Japanese Laid-Open Publication No. 8-218919

SUMMARY OF THE INVENTION

Meanwhile, when the target output torque of the internal combustion engine is calculated in light of the torque conversion in the transmission as stated above, the following problems may possibly occur.

In case of a vehicle including an automatic transmission, when a state of the vehicle turns into an acceleration state by depressing an accelerator pedal during steady-state driving, a transmission gear ratio of the automatic transmission is changed from a low state (high gear selection state) to a high state (low gear selection state).

The target output torque during acceleration is higher than that during the steady-state driving. Particularly when the transmission gear ratio is low in an initial stage of acceleration, an accelerating force tends to be insufficient. Due to this, even when a depression amount of the accelerator pedal is small, the target output torque abruptly rises immediately after depression and then falls as the transmission gear ratio is higher.

In this way, by changing the target output torque according to the transmission gear ratio, a sufficient accelerating force is obtained in the initial stage of acceleration in which the transmission gear ratio is low, and a smooth accelerating force is obtained from the initial stage of acceleration until the completion of acceleration.

If the target output torque abruptly rises in the initial stage of acceleration, then an opening of a throttle valve abruptly increases according to a change in the target output torque and an intake air amount abruptly increases. If the intake air amount has an abrupt increase, knocking tends to occur due to a delay in a change in a fuel injection amount relative to the intake air amount or a delay in knocking control for the abruptly increased intake air amount. Particularly in the state in which the transmission gear ratio is low, a driving resistance generated during transmission of power from an output shaft of the internal combustion engine to the input shaft of the automatic transmission is high. Due to this, even when the actual output torque of the internal combustion engine has an abrupt increase, the increase cannot be promptly transmitted to wheels. As a result, immediately after the abrupt increase in the output torque of the internal combustion engine, an engine load temporarily increases and, furthermore, knocking tends to occur.

Moreover, in the state in which the transmission gear ratio is low, because of the high driving resistance, shock possibly occurs temporarily to a drive system of the vehicle immediately after the output torque of the internal combustion engine abruptly rises.

It is an objective of the present invention to provide an output control device for an internal combustion engine capable of suppressing knocking or shock in a drive system resulting from an abrupt increase in a target output torque when a transmission gear ratio of an automatic transmission is low.

For the purpose of solving the problem above, according to a first aspect of the present invention, there is provided an output control device for an internal combustion engine that is mounted in a vehicle including an automatic transmission and includes air amount adjustment means for adjusting an intake air amount, the output control device calculating a target output torque of the internal combustion engine based on a manipulation amount of an accelerator pedal, a vehicle speed, and a state of a transmission gear ratio of the automatic transmission, and calculating a target actuation amount of the air amount adjustment means based on the calculated target output torque, wherein when a current value of the transmission gear ratio of the automatic transmission is smaller than a predetermined value, the target actuation amount calculated based on the target output torque is limited to be less than or equal to a preset upper limit.

With the configuration according to the first aspect of the present invention, the target output torque of the internal combustion engine is calculated based on the manipulation amount of the accelerator pedal, the vehicle speed, and the state of the transmission gear ratio of the automatic transmission, and the target actuation amount of the air amount adjustment means that adjusts the intake air amount is calculated based on the target output torque.

With the configuration according to the first aspect of the present invention, when the current value of the transmission gear ratio of the automatic transmission is smaller than the preset predetermined value, the target actuation amount calculated based on the target output torque is limited to be less than or equal to the preset upper limit. In such a state in which the transmission gear ratio is small, the actuation amount of the air amount adjustment means that adjusts the intake air amount is limited. Due to this, even when the target output torque abruptly increases in the state of a low transmission gear ratio, an abrupt increase in the intake air amount is suppressed, and an abrupt increase in the actual output torque is also suppressed. Therefore, in the state in which the transmission gear ratio is low, it is possible to suppress knocking caused by an abrupt increase in the intake air amount or shock at the drive system resulting from the abrupt increase of the output torque due to the abrupt increase of the target output torque.

For the purpose of solving the problem above, according to a second aspect of the present invention, there is provided an output control device for an internal combustion engine that is mounted in a vehicle including an automatic transmission and includes air amount adjustment means for adjusting an intake air amount, the output control device calculating a target output torque of the internal combustion engine based on a manipulation amount of an accelerator pedal, a vehicle speed, and a state of a transmission gear ratio of the automatic transmission, and calculating a target actuation amount of the air amount adjustment means based on the calculated target output torque, wherein when a current value of the transmission gear ratio of the automatic transmission is smaller than a predetermined value and an increase in the manipulation amount of the accelerator pedal is smaller than a specified value, the target actuation amount calculated based on the target output torque is limited to be less than or equal to a preset upper limit, and when the increase in the manipulation amount of the accelerator pedal is greater than or equal to the specified value, the target actuation amount is set to a maximum actuation amount of the air amount adjustment means.

With the configuration according to the second aspect of the present invention, the target output torque of the internal combustion engine is calculated based on the manipulation amount of the accelerator pedal, the vehicle speed, and the state of the transmission gear ratio of the automatic transmission, and the target actuation amount of the air amount adjustment means that adjusts the intake air amount is calculated based on the target output torque.

In this case, as stated above, when the current value of the transmission gear ratio of the automatic transmission is smaller than the preset predetermined value, the target actuation amount calculated based on the target output torque is limited to be less than or equal to the preset upper limit. By doing so, an abrupt increase in the intake air amount is suppressed even when the target output torque abruptly increases in the state in which the transmission gear ratio is low. Therefore, knocking resulting from the abrupt increase in intake air amount or shock to the drive system resulting from the abrupt increase in the output torque is suppressed. However, when the target actuation amount is limited in this manner, the increase in the output torque is suppressed even when the acceleration demand from a driver of the vehicle is high. Due to this, the driver's demand cannot be appropriately satisfied.

With the configuration according to the second aspect of the present invention, when the current value of the transmission gear ratio of the automatic transmission is smaller than the predetermined value, the increase in the manipulation amount of the accelerator pedal is smaller than the specified value and when the driver's acceleration demand is low, the target actuation amount calculated based on the target output torque is limited to be less than or equal to the preset upper limit. With this configuration, it is possible to suppress the knocking or the shock to the drive system while satisfying the driver's low acceleration demand.

Furthermore, with this configuration, when the current value of the transmission gear ratio of the automatic transmission is smaller than the predetermined value, the increase in the manipulation amount of the accelerator pedal is greater than or equal to the specified value and the driver's acceleration demand is relatively high, the target actuation amount is set to the maximum actuation amount of the air amount adjustment means. With this configuration, when the driver's acceleration demand is high, the intake air amount is increased to the maximum intake air amount and the output torque reaches the maximum output torque. It is, therefore, possible to appropriately satisfy the driver's high acceleration demand.

For the purpose of solving the above problem, according to a third aspect of the present invention, there is provided an output control device for an internal combustion engine that is mounted in a vehicle including an automatic transmission and includes air amount adjustment means for adjusting an intake air amount, the output control device calculating a target output torque of the internal combustion engine based on a manipulation amount of an accelerator pedal, a vehicle speed, and a state of a transmission gear ratio of the automatic transmission, and calculating a target actuation amount of the air amount adjustment means based on the calculated target output torque, wherein when a current value of the transmission gear ratio of the automatic transmission is smaller than a predetermined value and an increase in the manipulation amount of the accelerator pedal is smaller than a specified value, the target actuation amount calculated based on the target output torque is limited to be less than or equal to a preset upper limit, when the increase in the manipulation amount of the accelerator pedal is greater than or equal to the specified value, the target actuation amount is set based on the target output torque, and when the increase in the manipulation amount of the accelerator pedal is greater than or equal to the specified value and a degree of separation between a maximum output torque according to a rotational speed of the internal combustion engine and the target output torque is smaller than a predetermined value, the target actuation amount is set to a maximum actuation amount of the air amount adjustment means.

With the configuration according to the third aspect of the present invention, the target output torque of the internal combustion engine is calculated based on the manipulation amount of the accelerator pedal, the vehicle speed, and the state of the transmission gear ratio of the automatic transmission, and the target actuation amount of the air amount adjustment means that adjusts the intake air amount is calculated based on the target output torque.

With the configuration according to the third aspect of the present invention, when the current value of the transmission gear ratio of the automatic transmission is smaller than the predetermined value, the increase in the manipulation amount of the accelerator pedal is smaller than the specified value and when the driver's acceleration demand is low, the target actuation amount calculated based on the target output torque is limited to be less than or equal to the preset upper limit. With this configuration, it is possible to suppress the knocking or the shock to the drive system while satisfying the driver's low acceleration demand.

Furthermore, with this configuration, when the current value of the transmission gear ratio of the automatic transmission is smaller than the predetermined value and the increase in the manipulation amount of the accelerator pedal is greater than or equal to the specified value, the target actuation amount is set based on the target output torque. Accordingly, when the increase in the manipulation amount of the accelerator pedal is greater than or equal to the specified value, a limitation to the target actuation amount by the upper limit is cancelled and the output torque according to a driver's relatively high acceleration demand is obtained. It is, therefore, possible to appropriately satisfy the driver's acceleration demand.

Moreover, when the current value of the transmission gear ratio of the automatic transmission is less than or equal to the predetermined value, the increase in the manipulation amount of the accelerator pedal is greater than or equal to the specified value and the degree of separation between the maximum output torque according to the rotational speed of the internal combustion engine and the calculated target output torque is smaller than the predetermined value, the target actuation amount is set to the maximum actuation amount of the air amount adjustment means. If the increase in the manipulation amount of the accelerator pedal is greater than or equal to the specified value and the degree of separation between the maximum output torque according to the rotational speed of the internal combustion engine and the calculated target output torque is smaller than the predetermined value as stated above, it is estimated that the increase in the manipulation amount of the accelerator pedal is significantly large and that the driver's acceleration demand is significantly high. In such a case, therefore, the target actuation amount is set to the maximum actuation amount of the air amount adjustment means. Since the output torque is increased to the maximum output torque, the driver's significantly high acceleration demand is appropriately satisfied. Therefore, it is possible to more appropriately satisfy the driver's high acceleration demand according to the degree of the demand.

With the above configuration, it is preferable to set a transmission gear ratio at which knocking or shock to the drive system may possibly occur to follow an abrupt increase in the target output torque as the predetermined value for determination as to whether the current value of the transmission gear ratio of the automatic transmission is large or small.

With the above configuration, it is preferable to set a value at which it is possible to appropriately determine whether the driver's acceleration demand is high or low as the specified value for determination as to whether the increase in the manipulation amount of the accelerator pedal is large or small.

In the output control device for the internal combustion engine according to any one of the first to third aspects of the present invention, it is preferable that the actuation amount of the air amount adjustment means is set so as to reduce the output torque of the internal combustion engine by as much as a predetermined ratio with respect to the maximum output torque according to the rotational speed of the internal combustion engine. This appropriately suppresses an abrupt increase in the output torque of the engine through the limitation of the actuation amount of the air amount adjustment means.

In the output control device for the internal combustion engine stated above, it is preferable that the output torque of the internal combustion engine reduced by as much as the predetermined ratio is an output torque in a transitional region through which the output torque shifts from a region in which a change amount of the output torque relative to a change amount of the actuation amount is large to a region in which the change amount of the output torque relative to the change amount of the actuation amount is small.

In a state in which the actuation amount of the air amount adjustment means that adjusts the intake air amount is small and the intake air amount is small, the rate of change in the intake air amount relative to a change amount of the actuation amount of the air amount adjustment means tends to be high and the rate of change in the output torque of the internal combustion engine tends to be low. On the other hand, in a state in which the actuation amount of the air amount adjustment means is large and the intake air amount is large, the rate of change in the intake air amount relative to a change amount of the actuation amount of the air amount adjustment means tends to be low, and then the rate of change in the output torque of the internal combustion engine tends to be low, as well. Therefore, by setting, as the output torque of the internal combustion engine reduced by as much as the predetermined ratio, the output torque in the transitional region through which the output torque shifts from the region in which the rate of change in the output torque relative to the change amount of the actuation amount is large to the region in which the rate of change in the output torque relative to the change amount of the actuation amount is small, an output torque which is high to some extent is obtained even when the actuation amount of the air amount adjustment means is limited to be less than or equal to the upper limit. Due to this, even when the upper limit is set to suppress the abrupt increase in the intake air amount, the driver's acceleration demand is appropriately satisfied.

In the output control device for the internal combustion engine stated above, it is preferable that the air amount adjustment means is a throttle valve provided on an intake passage of the internal combustion engine. It is also preferable that the air amount adjustment means is a variable valve actuation mechanism adjusting the intake air amount by changing at least one of the maximum lift amount and a valve opening period of an intake valve of the internal combustion engine.

DETAILED DESCRIPTION OF THE PREFERRED EMBODIMENTS

First Embodiment

An output control device for an internal combustion engine according to a first embodiment of the present invention will be described hereinafter with reference to FIGS. 1 to 10.

Figure 1:
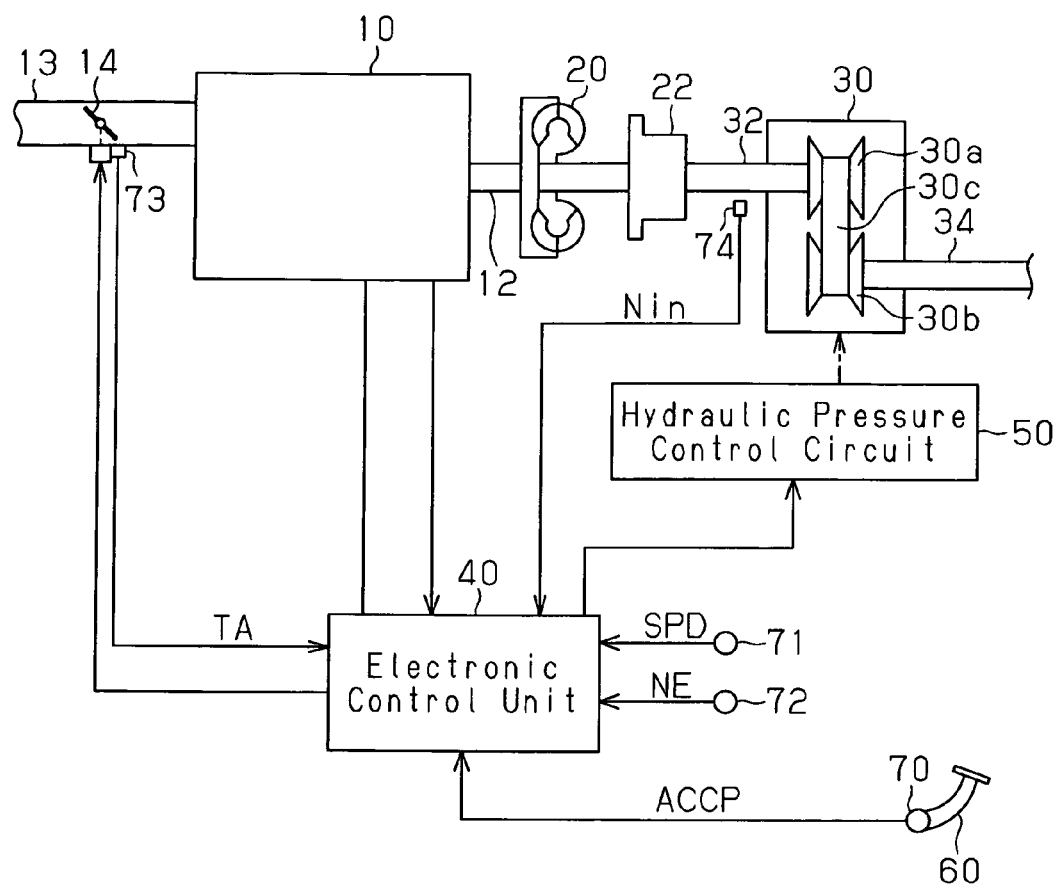
FIG. 1 is a diagram showing a schematic configuration of a vehicle to which an output control device according to the present invention is applied and a schematic configuration of an internal combustion engine mounted in the vehicle.

As shown in FIG. 1, an internal combustion engine 10 is mounted in a vehicle. An intake passage 13 for feeding air to a combustion chamber (not shown) communicates with the internal combustion engine 10. A throttle valve 14 serving as air amount adjustment means for adjusting an intake air amount is provided halfway along the intake passage 13. An electric motor (not shown) controls the opening degree of the throttle valve 14. On the intake passage 13, a fuel in an amount according to the intake air amount is injected from a fuel injection valve (not shown). Output power of the internal combustion engine 10 is obtained by combusting air fuel mixture in the combustion chamber.

A crankshaft 12 of the internal combustion engine 10 is connected to a torque converter 20. An output shaft of the torque converter 20 is connected to an input shaft of a planetary gear mechanism 22. The planetary gear mechanism 22 changes over a traveling direction of the vehicle to a forward or backward direction. An output shaft of the planetary gear mechanism 22 is connected to an input shaft 32 of a continuously variable transmission (hereinafter, "CVT") 30. An output shaft 34 of the CVT 30 is connected to a drive wheel (not shown) of the vehicle. The CVT 30 includes a first pulley 30a rotating along with the input shaft 32, a second pulley 30b rotating along with the output shaft 34, and a belt 30c transmitting a torque of the first pulley 30a to the second pulley 30b. By continuously changing pulley widths of the first pulley 30a and the second pulley 30b, the ratio (Nin/Nout) of the rotational speed of the output shaft 34 Nout to the rotational speed of the input shaft 32 Nin, that is, a transmission gear ratio R is changed continuously. The CVT 30 can change the transmission gear ratio R in a wider range than that of a multi-step transmission and in a continuous manner. Due to this, the internal combustion engine 10 operates in a range close to a line of optimal fuel consumption.

The torque converter 20 includes an oil pump (not shown) generating a hydraulic pressure for controlling the CVT 30. The pulley widths of the first pulley 30a and the second pulley 30b are controlled by a hydraulic pressure control executed by a hydraulic pressure control circuit 50.

Furthermore, each of the vehicle and the internal combustion engine 10 includes various sensors that detect the traveling state of the vehicle and the operating state of the internal combustion engine 10. For example, an accelerator sensor 70 that detects an accelerator manipulation amount ACCP is provided at an accelerator pedal 60 manipulated by a driver. A vehicle speed sensor 71 that detects a vehicle speed SPD is provided at wheels of the vehicle. A crank angle sensor 72 detecting a rotational speed NE of the internal combustion engine 10 is provided near the crankshaft 12 of the internal combustion engine 10. A throttle sensor 73 that detects a throttle opening degree TA is provided at the throttle valve 14. A rotational speed sensor 74 that detects the rotational speed of the input shaft (input rotational speed) Nin is provided at the input shaft 32 of the CVT 30.

An electronic control unit 40 executes various controls over the internal combustion engine 10 and the CVT 30. The electronic control unit 40 includes a CPU executing arithmetic processes for the various controls, a ROM storing therein programs and data necessary for the various controls, a RAM temporarily storing therein operation results of the CPU and input and output ports to or from which signals are input or output from or to outside.

The electronic control unit 40 executes an output control such as an intake air amount control and a fuel injection control over the internal combustion engine 10 or a transmission control over the CVT 30, based on the operating state of internal combustion engine 10 and the travelling state of the vehicle detected by the various sensors.

More specifically, the electronic control unit 40 calculates a target output torque Tp of the internal combustion engine 10 based on a driver's manipulation amount of the accelerator pedal 60 and adjusts an intake air amount based on the target output torque Tp, thereby executing a torque demand control for controlling an output torque of the internal combustion engine 10. Furthermore, the internal combustion engine 10 operates in a range close to the optimal fuel consumption line since the electronic control unit 40 executes the output control over the internal combustion engine 10 and the transmission control over the CVT 30 as an integrated control.

Figure 2:
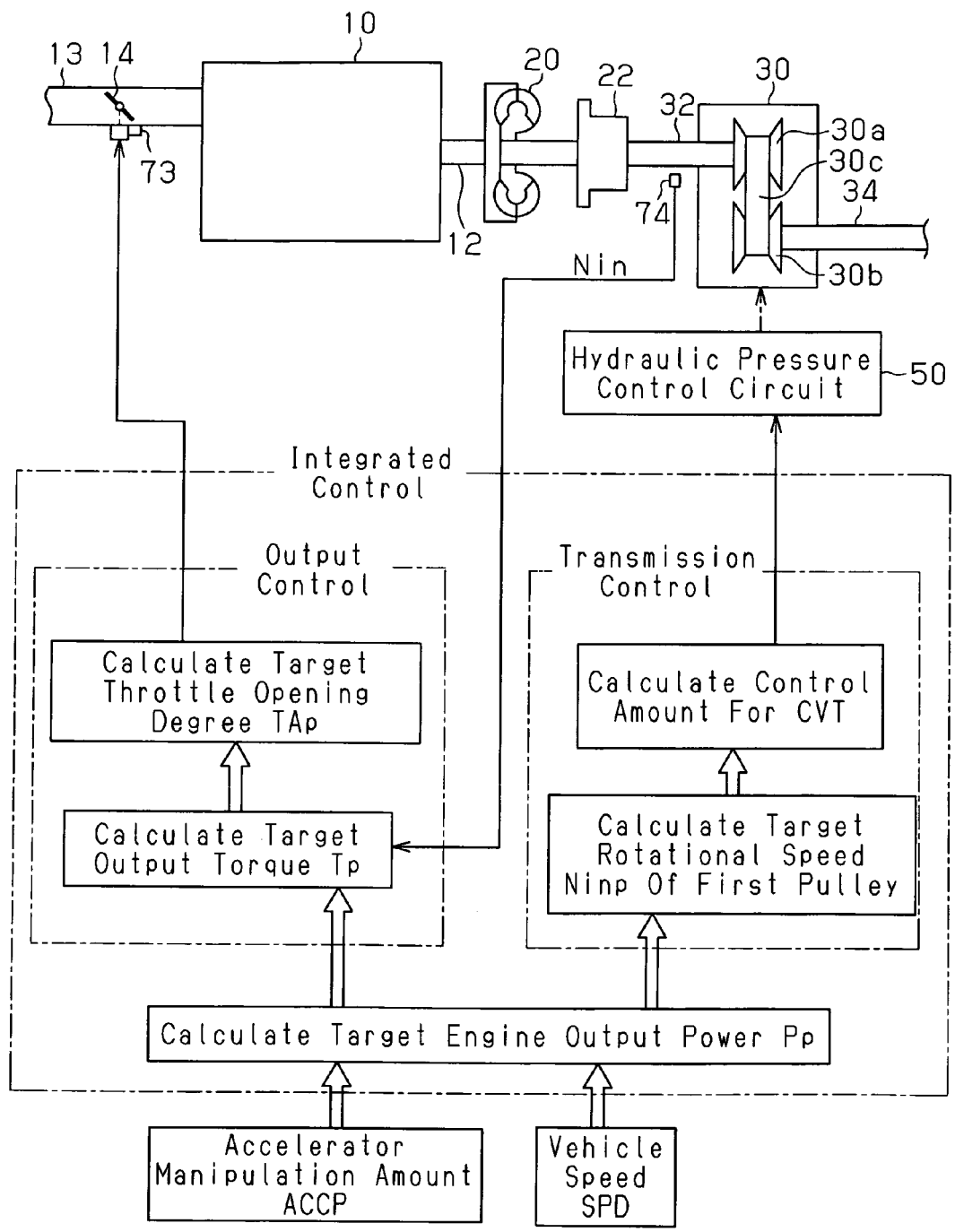
FIG. 2 is a conceptual diagram of integrated control in which output control over an internal combustion engine and transmission control over a transmission are integrated according to a first embodiment.

FIG. 2 shows outline of the integrated control. In this integrated control, the electronic control unit 40 calculates a target engine output power Pp required by the driver based on the accelerator manipulation amount ACCP and the vehicle speed SPD first. The electronic control unit 40 executes the transmission control and the output control based on the calculated target engine output power Pp.

Figure 3:
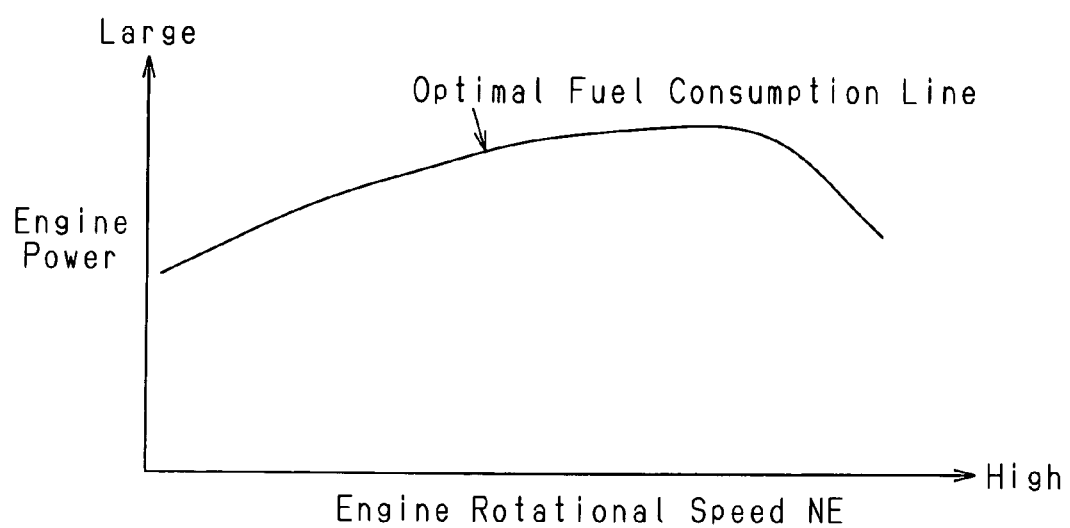
FIG. 3 is a graph showing a line of optimal fuel consumption.

In the transmission control, a target input rotational speed Ninp of the first pulley 30a is set so as to be able to achieve the set target engine output power Pp according to the optimal fuel consumption line of the internal combustion engine 10. The optimal fuel consumption line is a line that represents the correspondence between an engine output power P and a rotational speed NE of the internal combustion engine 10 at which a fuel consumption is suppressed to the maximum degree as shown in FIG. 3. The input shaft 32 rotating along with the first pulley 30a is connected to the crankshaft 12 via the torque converter 20 and the planetary gear mechanism 22. Accordingly, the electronic control unit 40 calculates the target input rotational speed Ninp at which the target engine output power Pp is obtained in a state of suppressing the fuel consumption to the maximum degree based on the optimal fuel consumption line.

Next, the electronic control unit 40 calculates a control amount for the CVT 30 based on the target input rotational speed Ninp and the CVT 30 shift gears based on the control amount. In the present embodiment, the pulley widths of the first pulley 30a and the second pulley 30b are adjusted so that the input rotational speed Nin of the input shaft 32 detected by the rotational speed sensor 74 coincides with the target input rotational speed Ninp.

In the output control, the electronic control unit 40 calculates the target output torque Tp based on the calculated target engine output power Pp and the actual rotational speed of the first pulley 30a, that is, input rotational speed Nin. The electronic control unit 40 calculates the target output torque Tp based on the following expression (1).

$$Tp=(Pp \times K)/Nin \tag{1}$$

Tp: target output torque [N·m]
Pp: target engine output power Pp [kW]
Nin: input rotational speed [rpm]
K: constant=9549.3

The electronic control unit 40 calculates a target throttle opening degree TAp based on the target output torque Tp. The opening of the throttle valve 14 is adjusted so that the target throttle opening degree TAp coincides with the throttle opening degree TA detected by the throttle sensor 73. Accordingly, the intake air amount according to the target output torque Tp is introduced into the combustion chamber and the fuel according to the intake air amount is injected from the fuel injection valve. As a result, the output torque T of the internal combustion engine 10 is adjusted to the target output torque Tp.

During acceleration of the vehicle, the electronic control unit 40 executes the following output control to correspond to a driver's demand. If the state of the vehicle turns into an acceleration state by depressing the accelerator pedal 60 during the steady-state driving, the transmission gear ratio R of the CVT 30 changes from a low state (high gear selection state) to a high state (low gear selection state) to correspond to the driver's acceleration demand.

The target output torque Tp during acceleration is higher than that during the steady-state driving due to an increase in the accelerator manipulation amount ACCP. Particularly, when the transmission gear ratio R is low in an initial stage of acceleration, an accelerating force tends to be insufficient. Due to this, even when a depression amount of the accelerator pedal 60 is small, the target output torque Tp abruptly rises immediately after depression and then falls as the transmission gear ratio R becomes higher.

In this way, by changing the target output torque Tp according to a state of the transmission gear ratio R, a sufficient accelerating force is obtained even in the initial stage of acceleration in which the transmission gear ratio R is low and a smooth accelerating force is obtained from the initial stage of acceleration until the completion of acceleration. If the electronic control unit 40 executes the output control corresponding to the acceleration demand as described above, the following problems may possibly occur.

Figure 4:
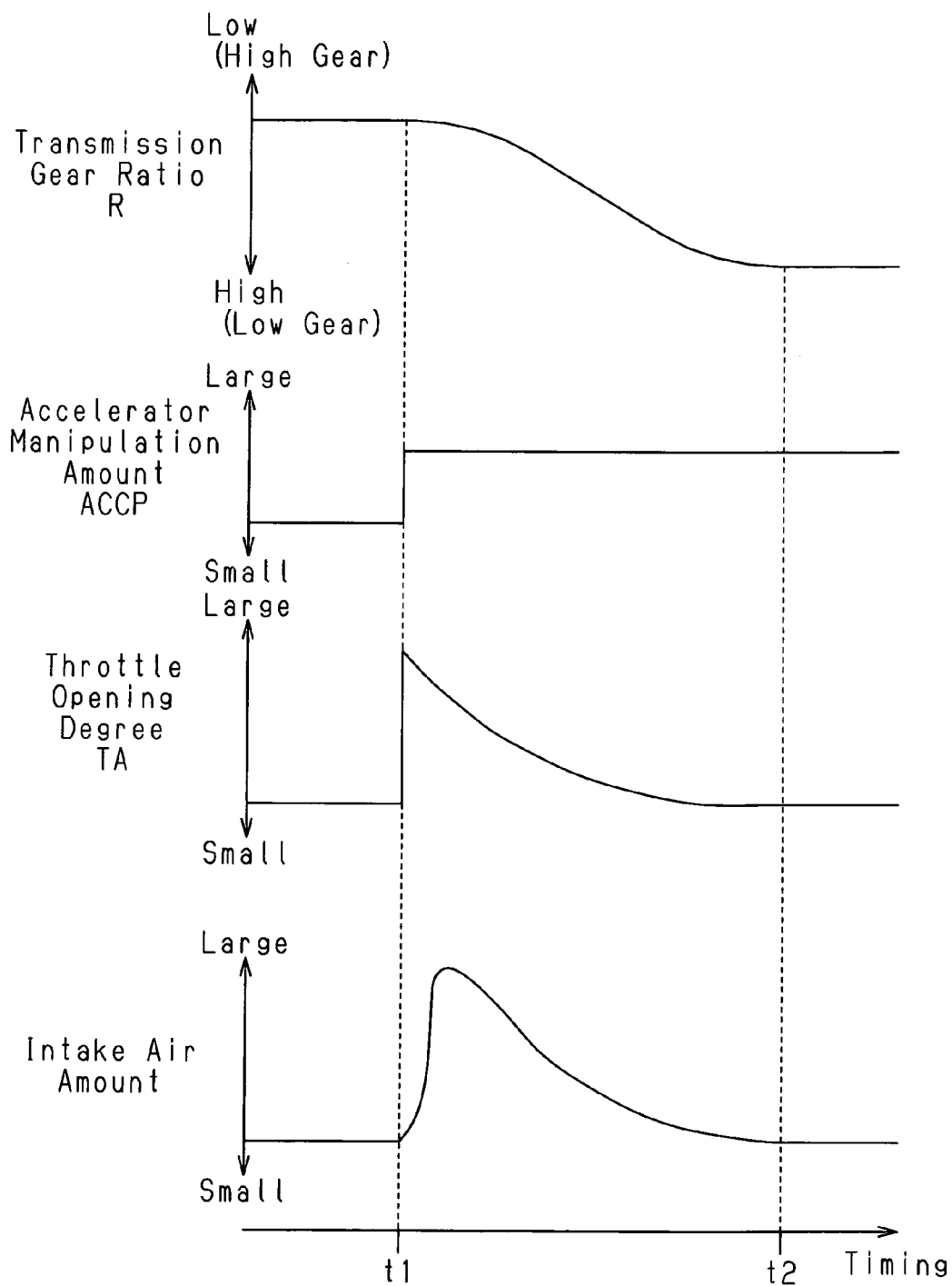
FIG. 4 is a timing chart showing changes in an intake air amount when an output control is executed to correspond to an acceleration demand.

For example, as shown in FIG. 4, when the driver depresses the accelerator pedal 60 in the state in which the transmission gear ratio R is low at time t1, the target output torque Tp abruptly increases even when the accelerator manipulation amount ACCP is relatively small. The opening (throttle opening degree TA) of the throttle valve 14 abruptly increases according to the abrupt increase in the target output torque Tp and the intake air amount abruptly increases. If the intake air amount has an abrupt increase, knocking tends to occur due to a delay in a change in a fuel injection amount relative to the intake air amount or a delay in knocking control for the abruptly increased intake air amount. Particularly, in the state in which the transmission gear ratio R is low, a driving resistance generated during transmission of power from the crankshaft 12 of the internal combustion engine 10 to the input shaft 32 of the CVT 30 is high. Due to this, even when the actual output torque T of the internal combustion engine 10 has an abrupt increase, the increase cannot be promptly transmitted to the wheels. As a result, immediately after the abrupt increase in the output torque T of the internal combustion engine 10, the engine load temporarily increases and knocking tends to occur accordingly. Moreover, in the state in which the transmission gear ratio R is low, because of the high driving resistance, a shock possibly occurs temporarily to a drive system of the vehicle immediately after the output torque T abruptly rises.

According to the present embodiment, therefore, a correction process for correcting the throttle opening degree TA, to be described below, is performed to suppress abrupt increases in the intake air amount and the output torque T, thereby suppressing the occurrence of knocking or shock in the drive system due to an abrupt increase in the target output torque Tp in the state in which the transmission gear ratio R of the CVT 30 is low.

Figure 5:
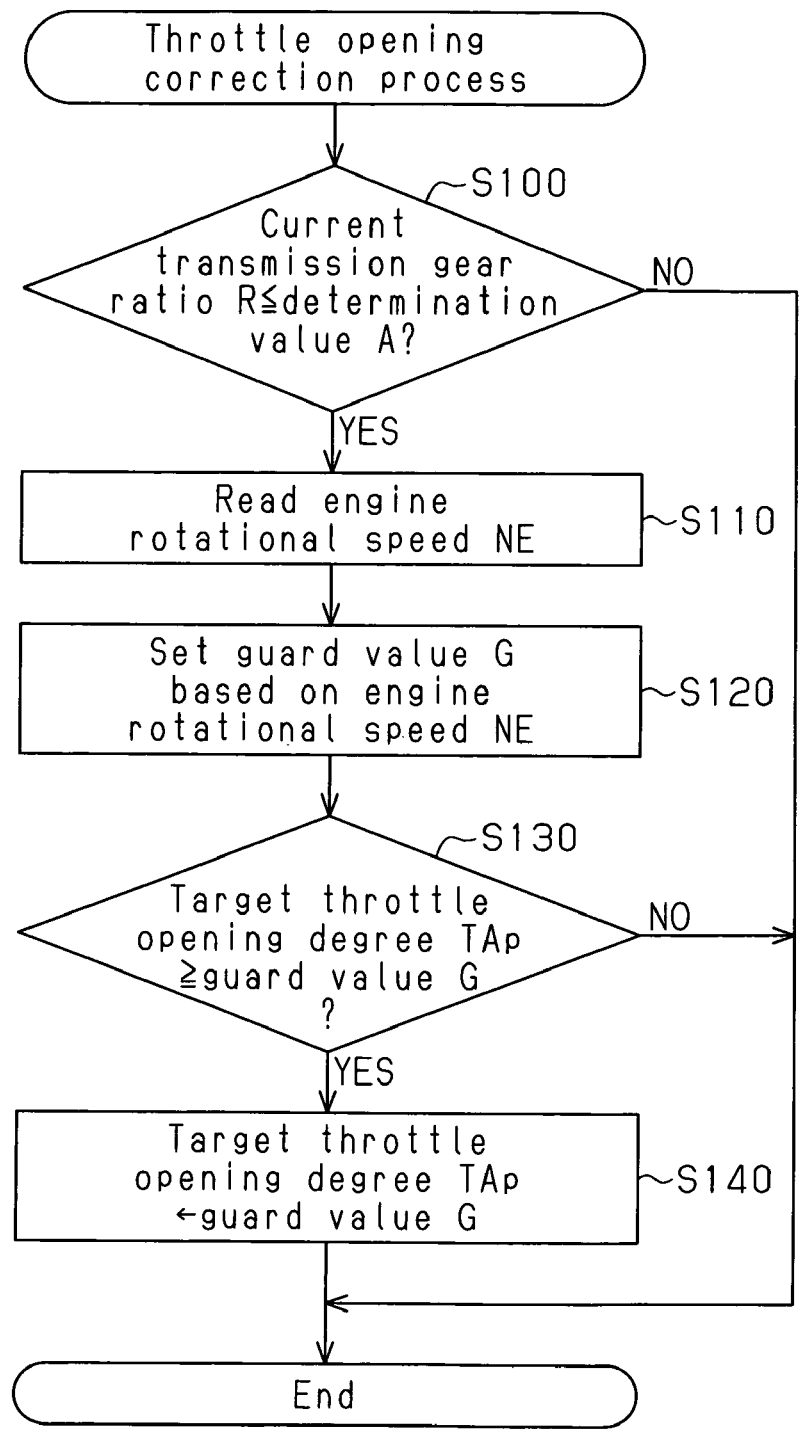
FIG. 5 is a flowchart showing procedures of a correction process for correcting a throttle opening degree according to the first embodiment.

FIG. 5 shows procedures of the correction process described above. The electronic control unit 40 repeatedly executes the correction process at predetermined time intervals.

When the correction process starts, the electronic control unit 40 determines whether the current value of the transmission gear ratio R is lower than or equal to a determination value A (S100). A value of the transmission gear ratio R at which knocking or shock to the drive system may possibly occur to follow an abrupt increase in the target output torque Tp is set to the determination value A.

If the current value of the transmission gear ratio R is in excess of the determination value A (S100: NO), the electronic control unit 40 determines that the current value of the transmission gear ratio R is high and that the above-stated problems will not occur, and temporarily suspends the correction process. In this case, the throttle opening degree TA of the throttle valve 14 is adjusted to the target throttle opening degree TAp calculated based on the target output torque Tp.

If the current value of the transmission gear ratio R is lower than or equal to the determination value A (S100: YES), the electronic control unit 40 determines that the current value of the transmission gear ratio R is low and that the above-stated problems will possibly occur, and continues the correction process as follows.

First, the electronic control unit 40 reads the current value of the rotational speed NE of the internal combustion engine 10 (S110). Next, the electronic control unit 40 sets a guard value G for limiting the maximum value of the target throttle opening degree TAp based on the current value of the rotational speed NE of the internal combustion engine 10 (S120). The guard value G is the throttle opening degree TA at which the output torque T of the internal combustion engine 10 is reduced by as much as a predetermined ratio with respect to the maximum output torque Tmax according to the rotational speed NE of the internal combustion engine 10. More specifically, the guard value G is a value set based on the following principle.

Figure 6:
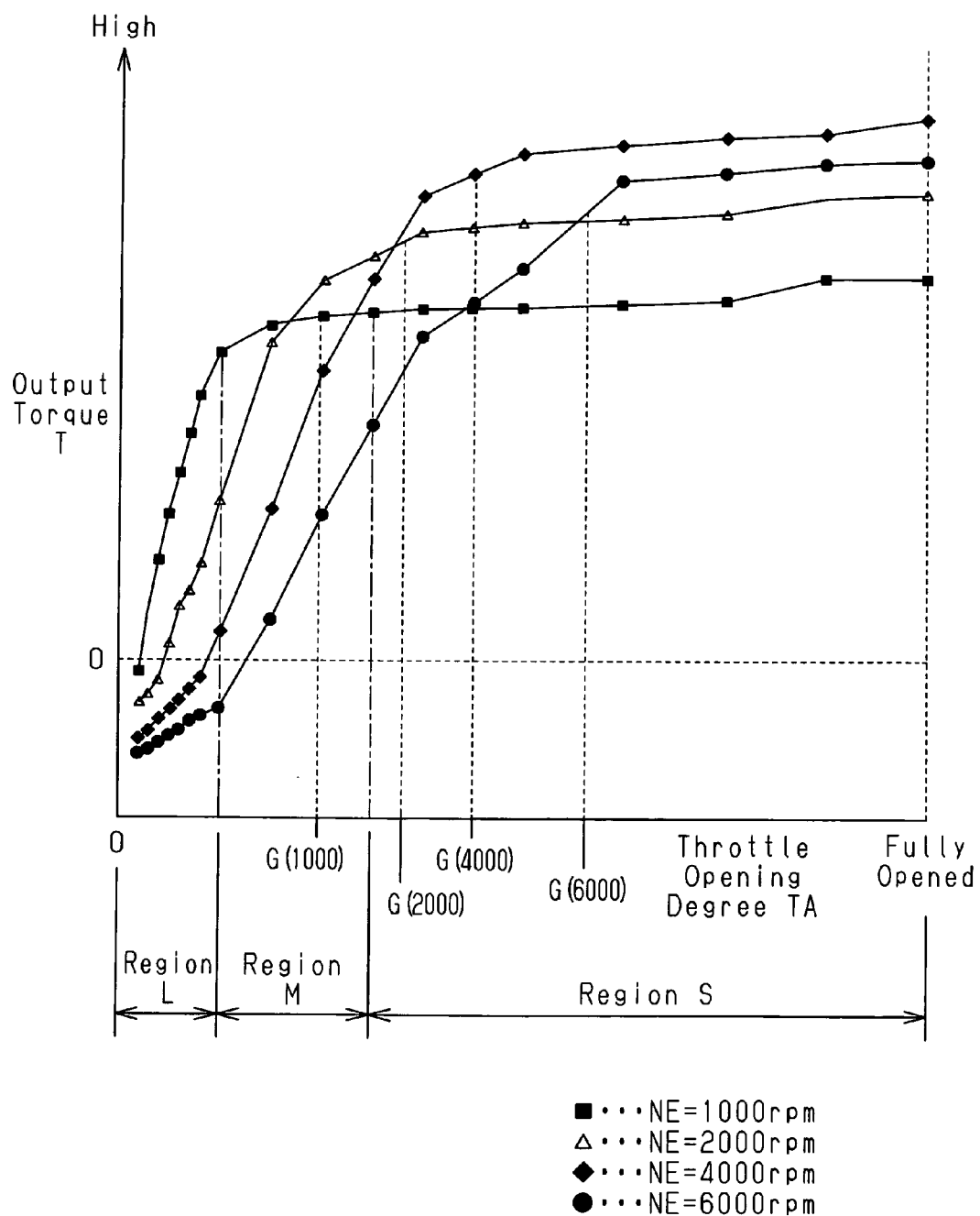
FIG. 6 is a graph showing the relationship between the throttle opening degree and an output torque.

FIG. 6 shows the relationship between the throttle opening degree TA and the output torque T of the internal combustion engine 10. As shown in FIG. 6, a change in the output torque T of the internal combustion engine 10 relative to a change in the throttle opening degree TA varies according to the rotational speed of the internal combustion engine 10. In a state in which the throttle opening degree TA is small and the intake air amount is small, the rate of change in the intake air amount relative to a change amount of the throttle opening degree TA is high and the rate of change in the output torque T tends to be high, as well (for example, at NE=1000 rpm, region L shown in FIG. 6). On the other hand, in a state in which the throttle opening degree TA is large and the intake air amount is large, the rate of change in the intake air amount relative to a change amount of the throttle opening degree TA is low and the rate of change in the output torque T of the internal combustion engine 10 tends to be low, as well (for example, at NE=1000 rpm, region S shown in FIG. 6). Considering these, according to the present embodiment, the output torque T in a transitional region (for example, at NE=1000 rpm, region M shown in FIG. 6) through which the rate of change in the output torque T relative to the change amount of the throttle opening degree TA shifts from a high value (for example, region L) to a low value (for example, region S) is set as the output torque T of the internal combustion engine 10 reduced by the predetermined ratio with respect to the maximum output torque Tmax. The throttle opening degree TA corresponding to the output torque T in the transitional region is set as the guard value G. Since the transitional region varies according to the rotational speed NE of the internal combustion engine 10, the guard value G is changed based on the rotational speed NE of the internal combustion engine 10. Further, by thus setting the guard value G, a relatively high output torque T is obtained even when the target throttle opening degree TAp, that is, the throttle opening degree TA is limited by the guard value G. Moreover, even when the guard value G is set so as to suppress the abrupt increase in the intake air amount, the driver's acceleration demand is satisfied.

In the internal combustion engine 10 according to the present embodiment, the output torque T about 90% of the maximum output torque Tmax, which varies according to the rotational speed of the internal combustion engine 10, is within the transitional region. Therefore, the throttle opening degree TA corresponding to the output torque T that is 90% of the maximum output torque Tmax is calculated for every rotational speed NE of the internal combustion engine 10 and the throttle opening degree TA corresponding to each rotational speed NE of the internal combustion engine 10 is set as the guard value G. For example, as shown in FIG. 6, when the rotational speed NE of the internal combustion engine 10 is 1000 rpm, G=G (1000) is set as the guard value G corresponding to the rotational speed NE. If the rotational speed NE of the internal combustion engine 10 is 2000 rpm, G=G (2000) greater than the guard value G (1000) above is set as the guard value G corresponding to the rotational speed NE. If the rotational speed NE of the internal combustion engine 10 is 4000 rpm, G=G (4000) greater than the guard value G (2000) is set as the guard value G corresponding to the rotational speed NE. If the rotational speed NE of the internal combustion engine 10 is 6000 rpm, G=G (6000) greater than the guard value G (4000) is set as the guard value G corresponding to the rotational speed NE.

If the guard value G is set in the step S120, the electronic control unit 40 determines whether the current value of the target throttle opening degree TAp is greater than or equal to the guard value G (S130). If the current value of the target throttle opening degree TAp is smaller than the guard value G (S130: NO), then the electronic control unit 40 determines that the current value of the target throttle opening degree TAp is relatively small and that the above-stated problems will not occur, and temporarily suspends this correction process. In this case, the throttle opening degree TA of the throttle valve 14 is adjusted to the target throttle opening degree TAp calculated based on the target output torque Tp.

If the current value of the target throttle opening degree TAp is greater than or equal to the guard value G (S130: YES), the electronic control unit 40 corrects the target throttle opening degree TAp to the guard value G and temporarily suspends this correction process.

Figure 7:
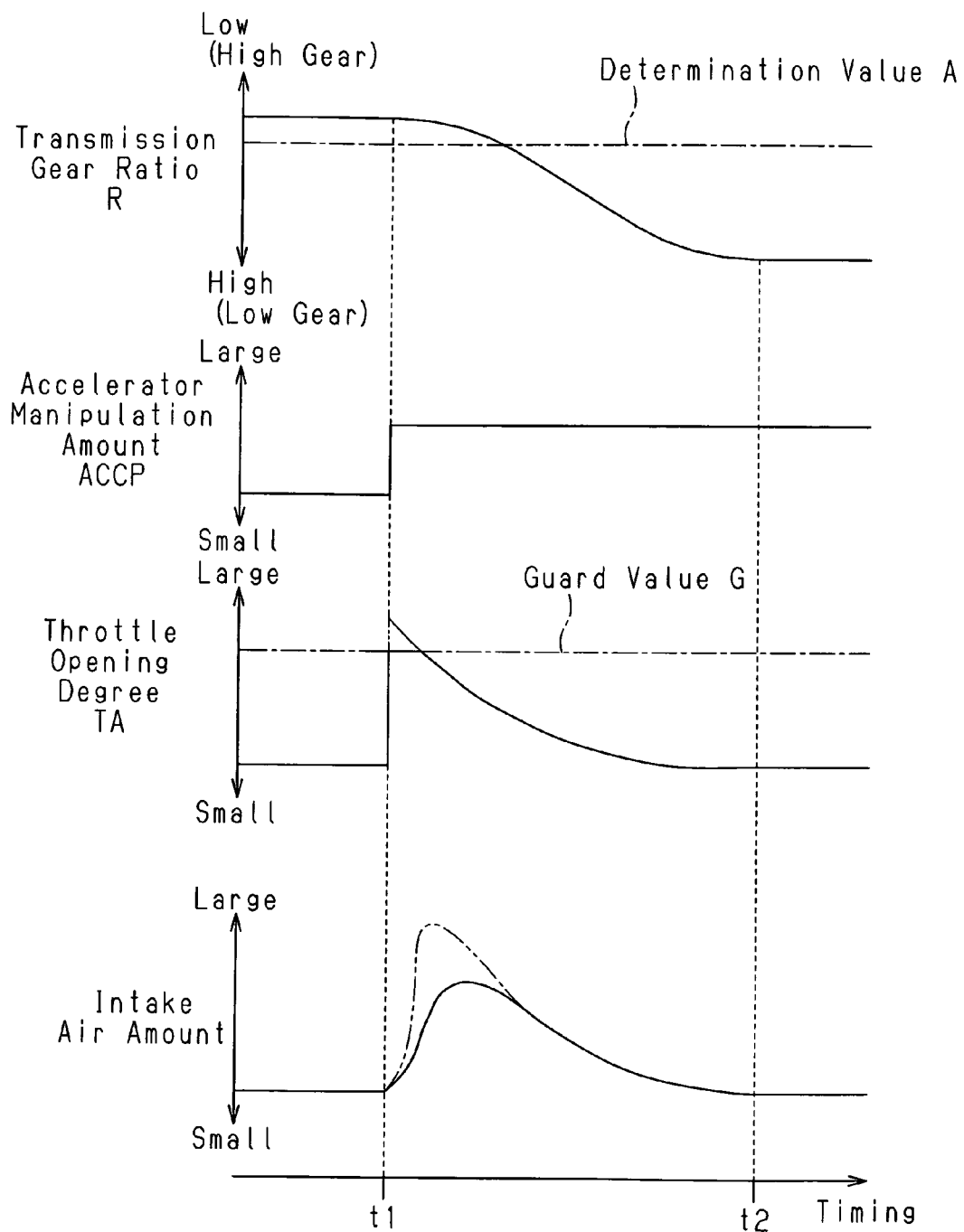
FIG. 7 is a timing chart showing changes in a target throttle opening and the intake air amount when the correction process is executed.

FIG. 7 shows an example of an aspect of correcting the target throttle opening degree TAp by executing the correction process.

As stated above, when the driver depresses the accelerator pedal 60 in the state in which the transmission gear ratio R is low (at time t1), the target output torque Tp abruptly increases even when the accelerator manipulation amount ACCP is relatively small.

At this time, when the current value of the transmission gear ratio R is lower than or equal to the determination value A, the target throttle opening degree TAp calculated based on the target output torque Tp is limited to be less than or equal to the guard value G. In this example, the calculated target throttle opening degree TAp (indicated by a two-dot chain line) is in excess of the guard value G. Due to this, the actual target throttle opening degree TAp is set to the guard value G. As a result, the intake air amount immediately after the abrupt increase in the target output torque Tp gradually increases as compared with an instance in which an upper limit of the target throttle opening degree TAp is not limited (indicated by a two-dot chain line).

In this way, in the state in which the transmission gear ratio R is low, the upper limit of the opening of the throttle valve 14 for adjusting the intake air amount is limited. Due to this, even when the target output torque Tp abruptly increases in the state of a low transmission gear ratio R, the abrupt increase in the intake air amount is suppressed and the abrupt increase in the actual output torque T is suppressed, accordingly. Therefore, in the state in which the transmission gear ratio R is low, it is possible to suppress knocking caused by an abrupt increase in the intake air amount or shock at the drive system resulting from the abrupt increase of the output torque T due to the abrupt increase of the target output torque Tp.

By limiting the target throttle opening degree TAp by the guard value G, the present embodiment exhibits the following advantages.

Generally, when a knocking occurs to an internal combustion engine, a knocking control including retarding the ignition timing and suppressing the occurrence of knocking is executed. In the internal combustion engine 10 according to the present embodiment as well, such a knocking control is executed. Meanwhile, when the ignition timing is retarded, such drawbacks as a rise in the exhaust temperature and a fall in the output torque T occur. Due to this, in the case of retarding the ignition timing, a critical ignition timing allowable for the rise in the exhaust temperature and the fall in the output torque T exists. In this case, the throttle opening degree TA is close to the full opening degree, the intake air amount is large and the actual compression ratio is high, so that knocking tends to occur. Therefore, when the throttle opening degree TA is close to the full opening degree, the ignition timing retarded to suppress the occurrence of knocking is often near the critical timing in some cases. Depending on situations, the retarded ignition timing reaches the critical timing shown above, and the occurrence of knocking cannot be suppressed by retarding the ignition timing. In this respect, according to the present embodiment, the target throttle opening degree TAp is limited by the guard value G and the maximum value of the target throttle opening degree TAp is also limited to the guard value G. Accordingly, while the throttle opening degree TA is limited, the throttle opening degree TA will not come close to the full opening degree and an increase in the actual compression ratio is suppressed to some extent. Due to this, as compared with an instance in which the throttle opening degree TA is close to the full opening degree, the ignition timing is advanced timing away from the critical timing and a retardation amount of the ignition timing for suppression of knocking is sufficiently secured. Therefore, even the conventional knocking control can sufficiently suppress the occurrence of knocking.

Moreover, as shown in FIG. 6, in a state in which the throttle opening degree TA is large and the intake air amount is large, the rate of change in the intake air amount relative to a change amount of the throttle opening degree TA tends to be low and the rate of change in the output torque T of the internal combustion engine 10 tends to be low. Therefore, for example, when the driver changes the manipulation amount of the accelerator pedal 60 and the target output torque Tp varies in a region in which the rate of change in the output torque T is low, the change amount of the target throttle opening degree TAp increases even with a small change amount of the target output torque Tp. Due to this, the throttle opening degree TA of the throttle valve 14 significantly changes, with the result that the durability of a driving mechanism such as the electric motor that adjusts the throttle opening of the throttle valve 14 is possibly deteriorated. In this respect, according to the present embodiment, the target throttle opening degree TAp is limited by the guard value G. Due to this, when the maximum value of the throttle opening degree TA is limited to be less than or equal to the guard value G, the throttle opening degree TA will not be within the region in which the rate of change in the output torque T is small. The durability of the driving mechanism such as the electric motor is, therefore, enhanced.

As described so far, the present embodiment exhibits the following functions and advantages.

(1) If the current value of the transmission gear ratio R of the CVT 30 is less than or equal to the determination value A (high gear), the target throttle opening degree TAp calculated based on the target output torque Tp is limited to be less than or equal to the guard value G that is a preset upper limit. Therefore, in the state in which the transmission gear ratio R is low, it is possible to suppress knocking caused by an abrupt increase in the intake air amount or shock at the drive system resulting from the abrupt increase of the output torque T due to the abrupt increase of the target output torque Tp.

(2) The throttle opening degree TA at which the output torque T of the internal combustion engine 10 is reduced by as much as the predetermined ratio with respect to the maximum output torque Tmax according to the rotational speed NE of the internal combustion engine 10 is set as the guard value G. By so setting, the increase in the output torque T of the internal combustion engine 10 is appropriately suppressed by limiting the throttle opening degree TA.

(3) As the output torque T of the internal combustion engine 10 reduced by as much as the predetermined ratio, the output torque T in the transitional region through which the change amount of the output torque T relative to the change amount of the throttle opening degree TA shifts from a large value to a small value. Due to this, even when the guard value G is set to suppress the abrupt increase in the intake air amount, the driver's acceleration demand is satisfied.

Second Embodiment

An output control device for an internal combustion engine according to a second embodiment of the present invention will be described hereinafter with reference to FIGS. 8 and 9.

In the first embodiment, when the current value of the transmission gear ratio R of a CVT 30 is less than or equal to the determination value A, the target throttle opening degree TAp calculated based on the target output torque Tp is limited to be less than or equal to the guard value G. However, when the target throttle opening degree TAp is limited in this manner, the increase in the output torque T is suppressed even when the acceleration demand from the driver of the vehicle is high. Due to this, the driver's demand cannot be appropriately satisfied.

In the present embodiment, therefore, the following process is performed as a correction process for correcting the throttle opening degree. The output control device according to the present embodiment will now be described while mainly referring to differences of the correction process according to the present embodiment from those according to the first embodiment.

Figure 8:
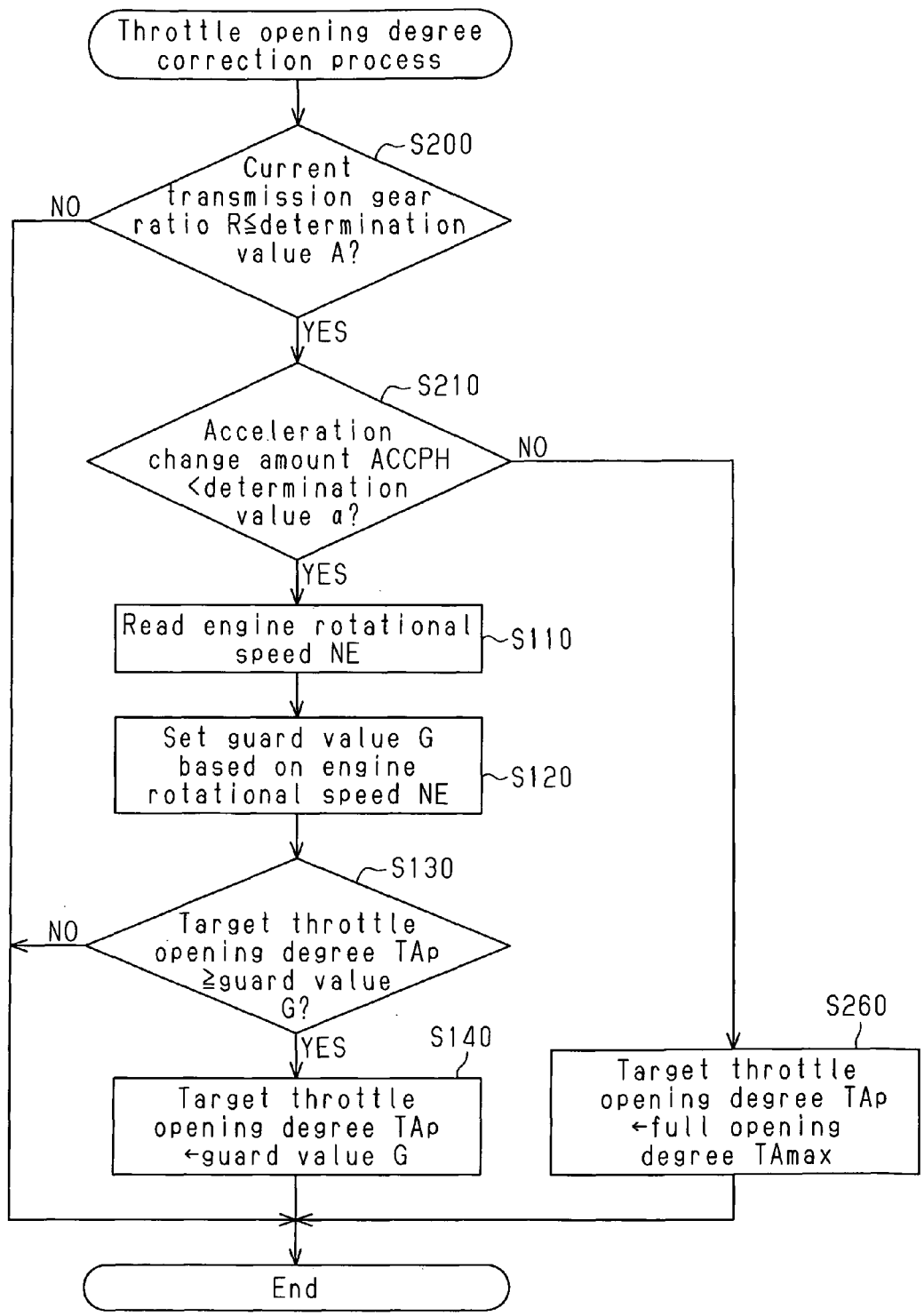
FIG. 8 is a flowchart showing procedures of a correction process for correcting a throttle opening degree according to a second embodiment of the present invention.

FIG. 8 shows procedures of the correction process for correcting the throttle opening degree according to the present embodiment. Similarly to the first embodiment, an electronic control unit 40 repeatedly performs this correction process at predetermined time intervals.

When the correction process starts, the electronic control unit 40 determines whether the current value of a transmission gear ratio R is lower than or equal to a determination value A (S200). A value of the transmission gear ratio R at which a knocking or a shock to the drive system may possibly occur to follow an abrupt increase in a target output torque Tp is set to the determination value A.

If the current value of the transmission gear ratio R is in excess of the determination value A (S200: NO), the electronic control unit 40 determines that the current value of the transmission gear ratio R is high and that knocking or shock to drive system resulting from the abrupt increase in the target output torque Tp will not occur and temporarily suspends the correction process. In this case, a throttle opening degree TA of the throttle valve 14 is adjusted toward the target throttle opening degree TAp calculated based on the target output torque Tp.

If the current value of the transmission gear ratio R is lower than or equal to the determination value A (S200: YES), the electronic control unit 40 determines whether an acceleration change amount ACCPH, which is a change amount of the accelerator manipulation amount ACCP within a predetermined time, is smaller than a determination value α (S210). The determination value α is a specified value for determination as to whether an increase in a manipulation amount of an accelerator pedal 60 is greater or smaller and for appropriate determination as to whether a driver's acceleration demand is high or low.

If the acceleration change amount ACCPH is greater than or equal to the determination value α (S210: NO), the electronic control unit 40 determines that the driver's acceleration demand is high. The electronic control unit 40 corrects the target throttle opening degree TAp to a full opening degree TAmax that is the maximum actuation amount of the throttle valve 14 (S260) and temporarily suspends the correction process. In this case, since the throttle opening degree TA of the throttle valve 14 is adjusted toward the full opening degree TAmax, the output torque T of an internal combustion engine 10 reaches the maximum output torque Tmax and the maximum accelerating force is obtained.

On the other hand, when the acceleration change amount ACCPH is smaller than the determination value α (S210: YES), the electronic control unit 40 determines that the driver's acceleration demand is low. In this case, to suppress the occurrence of the above-stated problems rather than to secure the accelerating force, the electronic control unit 40 performs the process from the steps S110 through S140 shown in FIG. 5. As a consequence, the second embodiment exhibits similar functions and advantages to those of the first embodiment.

Figure 9:
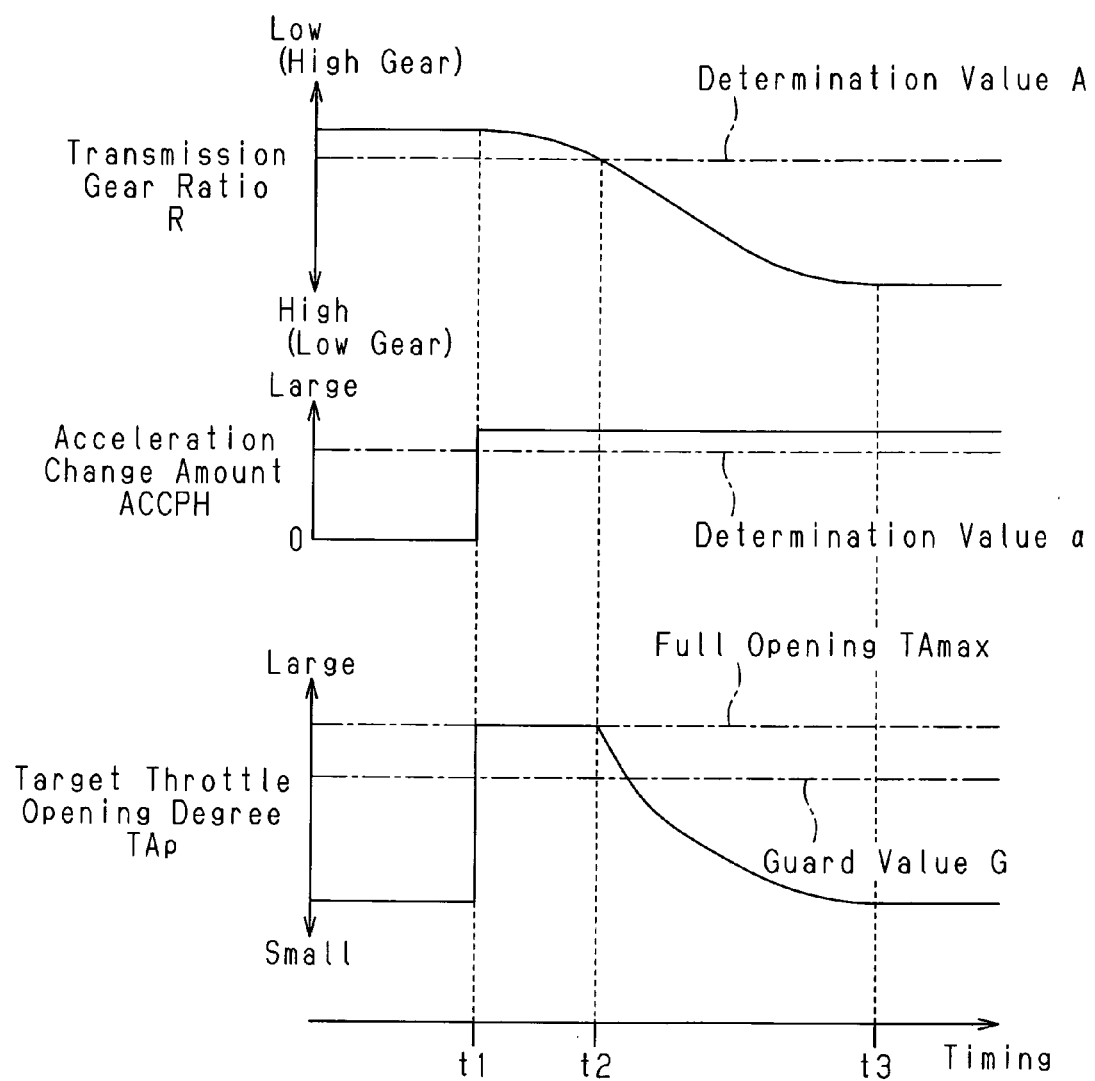
FIG. 9 is a timing chart showing a state of setting a target throttle opening degree when the correction process is executed.

FIG. 9 shows an example of an aspect of correcting the target throttle opening degree TAp to the full opening degree TAmax when the correction process is executed.

As already stated, when a driver depresses the accelerator pedal 60 in a state in which the transmission gear ratio R is low (at time t1), the target output torque Tp abruptly increases.

At this time, when the current value of the transmission gear ratio R is less than or equal to the determination value A and the acceleration change amount ACCPH is greater than or equal to the determination value α, the target throttle opening degree TAp calculated based on the target output torque Tp is corrected to the full opening degree TAmax. As a result, immediately after depression of the accelerator pedal 60, the throttle valve 14 is fully opened and an intake air amount reaches the maximum intake air amount. As a consequence, the output torque T of the internal combustion engine 10 reaches the maximum output torque Tmax and the maximum accelerating force is obtained. In this way, when the driver's acceleration demand is high, the output torque T is increased to the maximum output torque Tmax and it is, therefore, possible to appropriately satisfy the driver's acceleration demand.

As stated so far, the present embodiment exhibits the following functions and advantages as well as those exhibited by the first embodiment.

(4) When the current value of the transmission gear ratio R of the CVT 30 is lower than or equal to the determination value A (high gear) and the acceleration change amount ACCPH is smaller than the determination value α, the target throttle opening degree TAp calculated based on the target output torque Tp is limited to be less than or equal to the guard value G, which is a preset upper limit. Accordingly, while satisfying the driver's low acceleration demand, in the state in which the transmission gear ratio R is low, it is possible to suppress knocking caused by a sudden increase in the intake air amount or shock at the drive system resulting from a sudden increase of the output torque T due to a sudden increase of the target output torque Tp.

(5) If the current value of the transmission gear ratio R of the CVT 30 is less than or equal to the determination value A (high gear) and the acceleration change amount ACCPH is greater than or equal to the determination value α, the target throttle opening degree TAp calculated based on the target output torque Tp is changed to the full opening degree TAmax. The driver's high acceleration demand is, therefore, satisfied.

Third Embodiment

An output control device for an internal combustion engine according to a third embodiment of the present invention will be described hereinafter with reference to FIGS. 10 to 12.

In the second embodiment, when the driver's acceleration demand is high, the throttle valve 14 is fully opened irrespectively of a degree of the demand.

In the present embodiment, another process is added to the correction process described in the second embodiment. Therefore, when the driver's acceleration demand is high, a throttle opening degree TA of the throttle valve 14 is adjusted according to the degree of the demand. The output control device according to the present embodiment will now be described while mainly referring to differences of the correction process according to the present embodiment from those according to the second embodiment.

Figure 10:
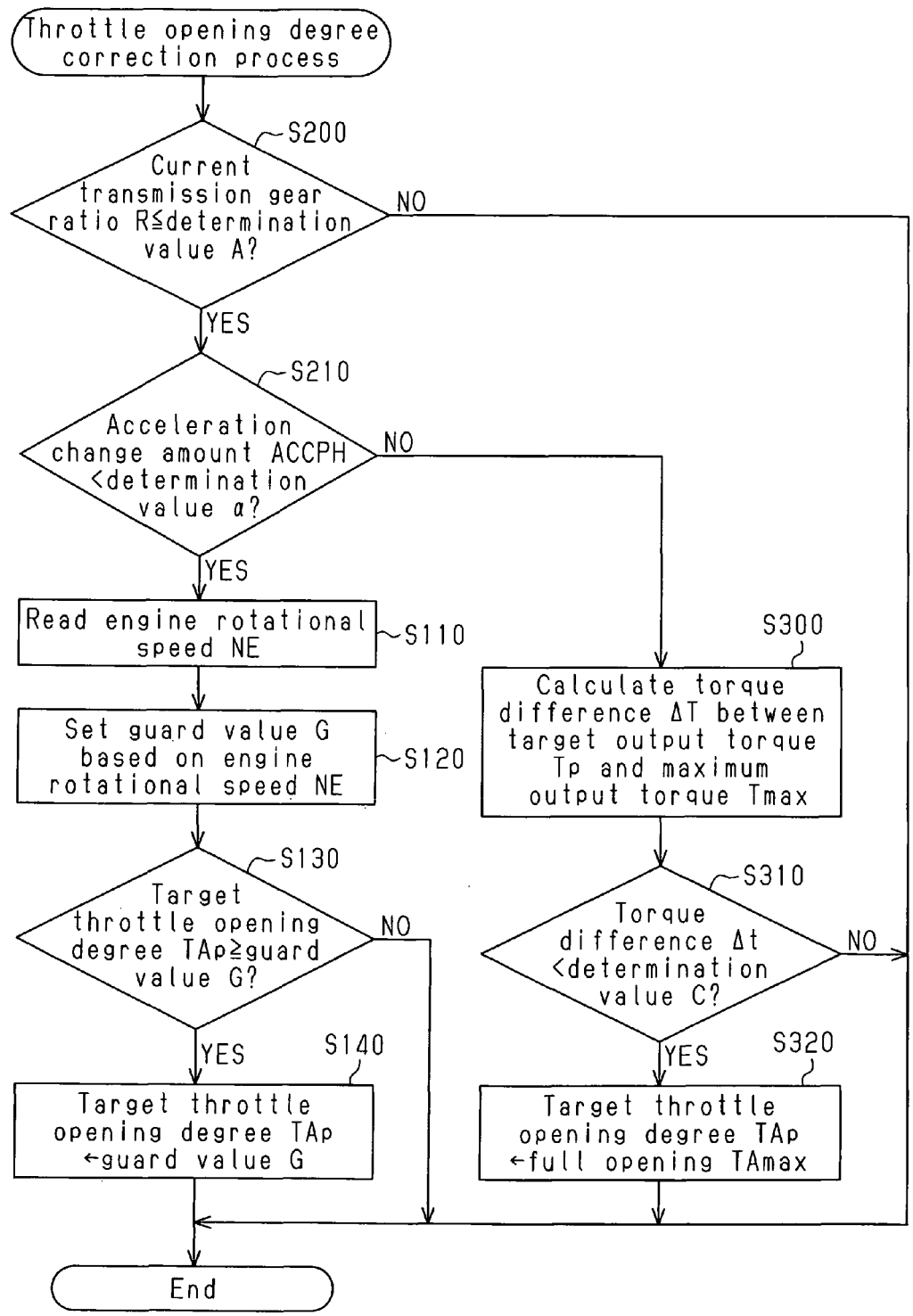
FIG. 10 is a flowchart showing procedures of a correction process for correcting a throttle opening degree according to a third embodiment of the present invention.

FIG. 10 shows procedures of the correction process for correcting the throttle opening degree according to the present embodiment. Similarly to the first and the second embodiments, an electronic control unit 40 repeatedly performs this correction process at predetermined time intervals.

When the correction process is started, the electronic control unit 40 determines whether the current value of a transmission gear ratio R is lower than or equal to a determination value A (S200). A value of the transmission gear ratio R at which knocking or shock to the drive system will possibly occur to follow an abrupt increase in a target output torque Tp is set to the determination value A.

If the current value of the transmission gear ratio R is in excess of the determination value A (S200: NO), the correction process is temporarily suspended. In this case, the throttle opening degree TA of the throttle valve 14 is adjusted toward a target throttle opening degree TAp calculated based on the target output torque Tp.

If the current value of the transmission gear ratio R is lower than or equal to the determination value A (S200: YES), the electronic control unit 40 determines whether an acceleration change amount ACCPH that is a change amount of an accelerator manipulation amount ACCP within predetermined time is smaller than a determination value α (S210). The determination value α is a specified value for determination as to whether an increase in a manipulation amount of an accelerator pedal 60 is large or small and for appropriate determination as to whether a driver's acceleration demand is high or low.

If the acceleration change amount ACCPH is less than the determination value α (S210: YES), the electronic control unit 40 performs the process from the steps S110 through S140 shown in FIG. 5 so as to suppress the occurrence of knocking or shock to a drive system resulting from an abrupt increase in the target output torque Tp rather than to secure an accelerating force since the driver's acceleration demand is low. As a consequence, the third embodiment can exhibit similar functions and advantages to those of the first embodiment.

If the acceleration change amount ACCPH is greater than or equal to the determination value α (S210: NO), the electronic control unit 40 subsequently performs the following process to satisfy the driver's acceleration demand.

First, a torque difference ΔT that indicates the degree of separation by which the maximum output torque Tmax at the current rotational speed NE of engine is separated from the target output torque Tp (S300). This torque difference ΔT is calculated based on the following expression (2).

$$\Delta T = T\text{max} - Tp \quad (2)$$

ΔT: torque difference
Tmax: maximum output torque at current rotational speed NE of engine
Tp: current target output torque The electronic control unit 40 determines whether this torque difference ΔT is smaller than a determination value C (S310). As the torque difference ΔT is smaller, the degree of separation between the maximum output torque Tmax and the target output torque Tp is smaller. Namely, the target output torque Tp is set to be approximate to the maximum output torque Tmax. In this way, it is possible to estimate the degree of the driver's acceleration demand based on the value of the torque difference ΔT. The determination value C is a value for determination as to whether the degree of the demand is significantly high when the driver's acceleration demand is high.

If the torque difference ΔT is smaller than the determination value C (S310: YES), it is estimated that the acceleration change amount ACCPH that indicates an increase in the accelerator manipulation amount ACCP is significantly large and that the degree of the driver's acceleration demand is significantly high. Due to this, the electronic control unit 40 corrects the target throttle opening degree TAp to a full opening degree TAmax, which is the maximum actuation amount of the throttle valve 14 (S320), and temporarily suspends the correction process. If the process in the step S320 is performed, the throttle opening degree TA of the throttle valve 14 is adjusted toward the full opening degree Tmax. The output torque T of an internal combustion engine 10 thereby reaches the maximum output torque Tmax and the maximum accelerating force is obtained.

If the torque difference ΔT is greater than or equal to the determination value C (S310: NO), it is estimated that the driver's acceleration demand is high but that the degree of the demand is relatively low. Therefore, in this case, the correction process is temporarily suspended without correcting the target throttle opening degree TAp.

Figure 11:
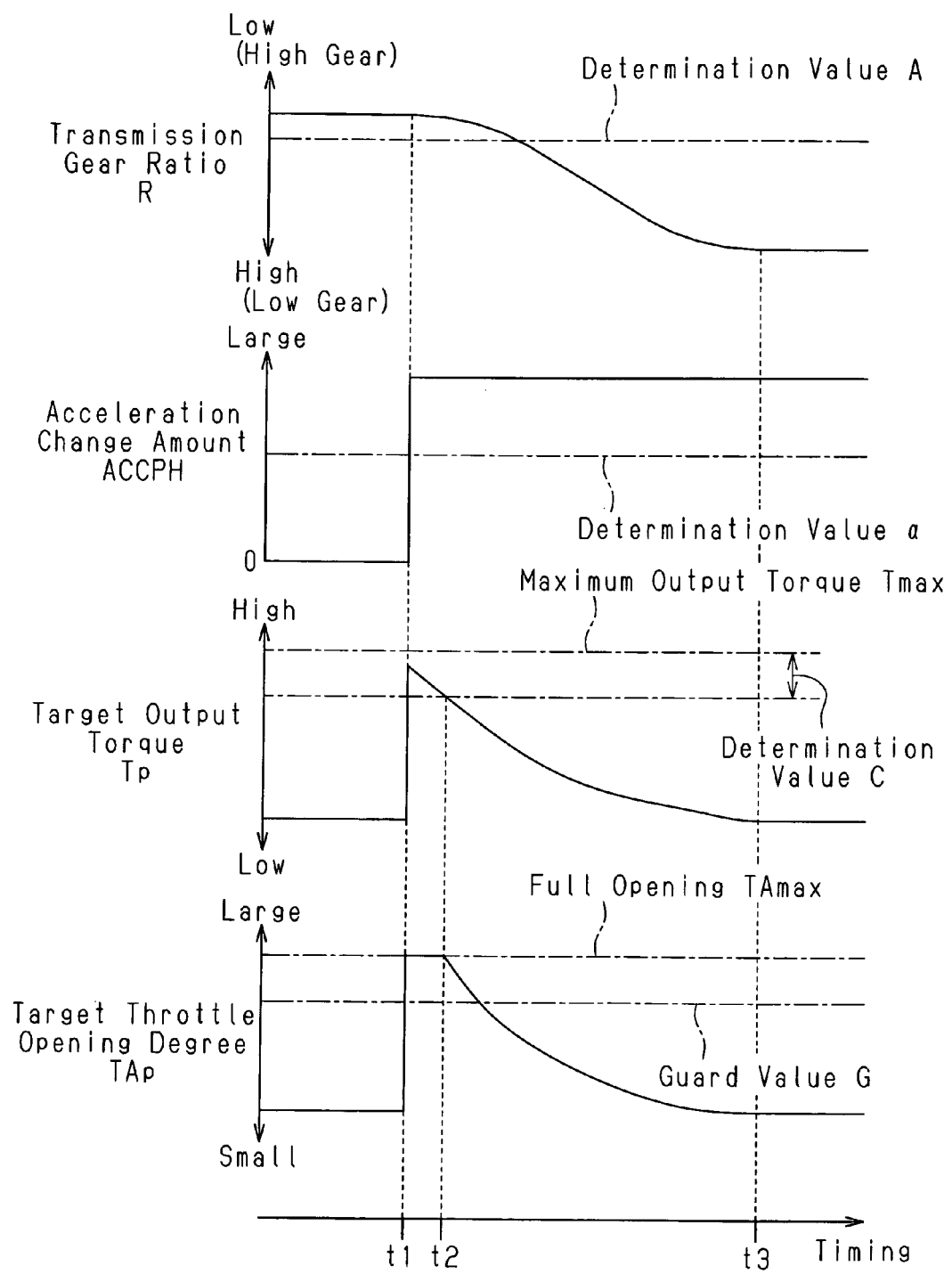
FIG. 11 is a timing chart showing a state of setting a target throttle opening degree when the correction process is executed.

FIG. 11 shows an example of an aspect of setting the target throttle opening degree TAp when the correction process is performed, the acceleration change amount ACCPH is greater than or equal to the determination value α and the torque different ΔT is greater than or equal to the determination value C.

As already stated, when a driver depresses the accelerator pedal 60 in a state in which the transmission gear ratio R is low (at time t1), the target output torque Tp abruptly increases.

FIG. 11 shows one example of setting of the target throttle opening degree TAp by the correction process when the driver's acceleration demand is significantly high.

As already stated, when the driver depresses the accelerator pedal 60 in the state in which the transmission gear ratio R is low (at time t1), the target output torque Tp abruptly increases.

At this time, when the current value of the transmission gear ratio R is less than or equal to the determination value A, the acceleration change amount ACCPH is greater than or equal to the determination value α and the torque difference ΔT is smaller than the determination value C, the target throttle opening degree TAp calculated based on the target output torque Tp is corrected to the full opening degree TAmax. As a result, immediately after the driver depresses the accelerator pedal 60, the throttle valve 14 is fully opened and the intake air amount increases to the maximum intake air amount. Further, the output torque of the internal combustion engine 10 reaches the maximum output torque Tmax and the maximum accelerating force is obtained. In this way, when the driver's acceleration demand is significantly high, the output torque T is increased to the maximum output torque Tmax and the driver's significantly high acceleration demand is, therefore, satisfied.

Figure 12:
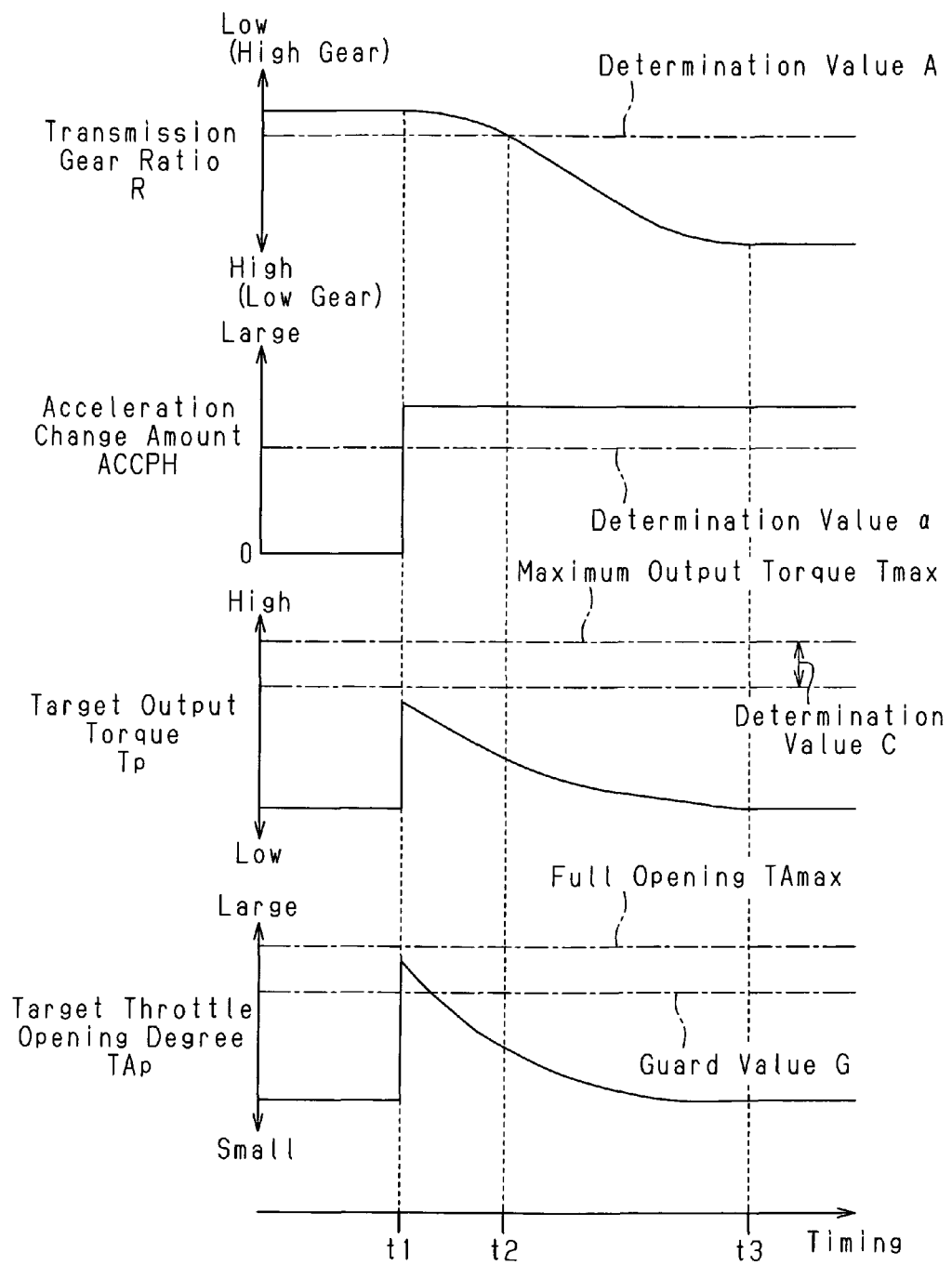
FIG. 12 is a timing chart showing a state of setting the target throttle opening degree when the correction process is executed.

FIG. 12 shows one example of setting of the target throttle opening degree TAp by the correction process when the driver's acceleration demand is high but the degree of the demand is relatively low.

When the driver depresses the accelerator pedal 60 in the state in which the transmission gear ratio R is low (at time t1), the target output torque Tp abruptly increases.

At this time, when the current value of the transmission gear ratio R is less than or equal to the determination value A, the acceleration change amount ACCPH is greater than or equal to the determination value α and the torque difference ΔT is greater than or equal to the determination value C, the target throttle opening degree TAp is set to the value calculated based on the target output torque Tp without being limited by the guard value G. Due to this, the throttle opening degree TA of the throttle valve 14 is adjusted to the opening at which the target output torque Tp is obtained. In this way, when the current value of the transmission gear ratio R is less than or equal to the determination value A and the acceleration change amount ACCPH is greater than or equal to the determination value α, a limitation to the target throttle opening degree TAp by the guard value G is cancelled and the output torque T according to a driver's relatively high acceleration demand is obtained. It is, therefore, possible to appropriately satisfy the driver's acceleration demand.

As stated so far, according to the present embodiment, it is possible to exhibit the following functions and advantages as well as those exhibited by the first and second embodiment.

(6) When the current value of the transmission gear ratio R of a CVT 30 is less than or equal to the determination value A and the acceleration change amount ACCPH is greater than or equal to the determination value α, the value calculated based on the target output torque Tp is set as the target throttle opening degree TAp. Therefore, the output torque T according to the driver's relatively high acceleration demand is obtained and the driver's acceleration demand is, therefore, satisfied.

Moreover, when the current value of the transmission gear ratio R of the CVT 30 is lower than or equal to the determination value A, the acceleration change amount ACCPH is greater than or equal to the determination value α and the torque difference ΔT that indicates the degree of separation between the maximum output torque Tmax according to the rotational speed NE of the internal combustion engine 10 and the target output torque Tp is smaller than the determination value C, the target throttle opening degree TAp calculated based on the target output torque Tp is set to the full opening degree TAmax. Therefore, the driver's significantly high acceleration demand is appropriately satisfied. According to the present embodiment, therefore, it is possible to appropriately satisfy the driver's high acceleration demand according to the degree of the demand, as compared with the second embodiment.

The embodiments may be modified, for example, as follows.

The guard value G is set based on the rotational speed NE of the internal combustion engine 10. Alternatively, the guard value G may be a fixed value. For example, a smallest guard value G among the respective rotational speeds NE of the internal combustion engine 10 may be set as the guard value G.

The throttle opening degree TA corresponding to the output torque T that is 90% of the maximum output torque Tmax is set as the guard value G. However, the setting of the guard value G is not limited to this. It suffices that the throttle opening degree TA corresponding to the output torque in the transitional region through which the change amount of the output torque T shifts from a high value to a low value is set as the guard value G. By doing so, similar functions and advantages are exhibited to those of the first to third embodiments.

The throttle opening degree TA corresponding to the output torque T in the transitional region is set as the guard value G. Alternatively, the throttle opening degree TA at which the output torque T of the internal combustion engine is reduced by as much as a predetermined ratio with respect to the maximum output torque Tmax according to the rotational speed of the internal combustion engine may be set as the guard value G. In this case also, an abrupt increase in the output torque T of the engine is appropriately suppressed by limiting the throttle opening degree TA.

In the second embodiment, the torque difference ΔT is calculated so as to determine whether the degree of separation between the maximum output torque Tmax and the target output torque Tp is smaller than the predetermined value. Alternatively, a determination may be made as to whether the degree of separation is smaller than the predetermined value. For example, the ratio of the target output torque Tp with respect to the maximum output torque Tmax is calculated and it may be determined that the degree of separation is smaller than the predetermined value when the ratio is greater than a preset value.

The automatic transmission according to each of the first to third embodiments is the CVT (continuously variable transmission), which is a transmission capable of continuously changing the transmission gear ratio R when the state of the transmission gear ratio R is changed from a low state to a high state during acceleration of the vehicle. A multi-step automatic transmission differs from the CVT in that the transmission gear ratio is changed from a low state to a high state step by step. However, the multi-step automatic transmission is the same as the CVT in that knocking or shock to the drive system occurs when the target output torque Tp abruptly increases in the state in which the transmission gear ratio is low. Accordingly, the present invention may be applied to an internal combustion engine of a vehicle including the multi-step automatic transmission.

In the embodiments stated above, the air amount adjustment means for adjusting the intake air amount is the throttle valve 14. Alternatively, the present invention may be applied to an internal combustion engine including other air amount adjustment means.

Figure 13:
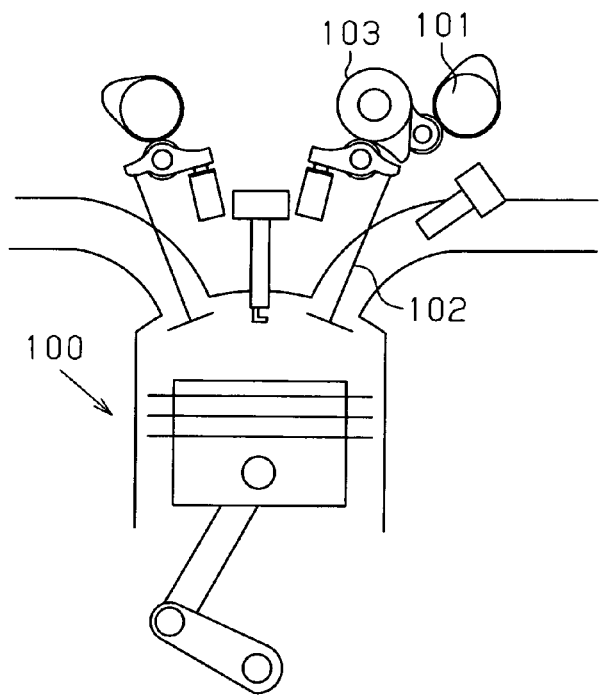
FIG. 13 is a diagram showing a schematic configuration of an internal combustion engine according to modifications of the first to third embodiments.
Figure 14:
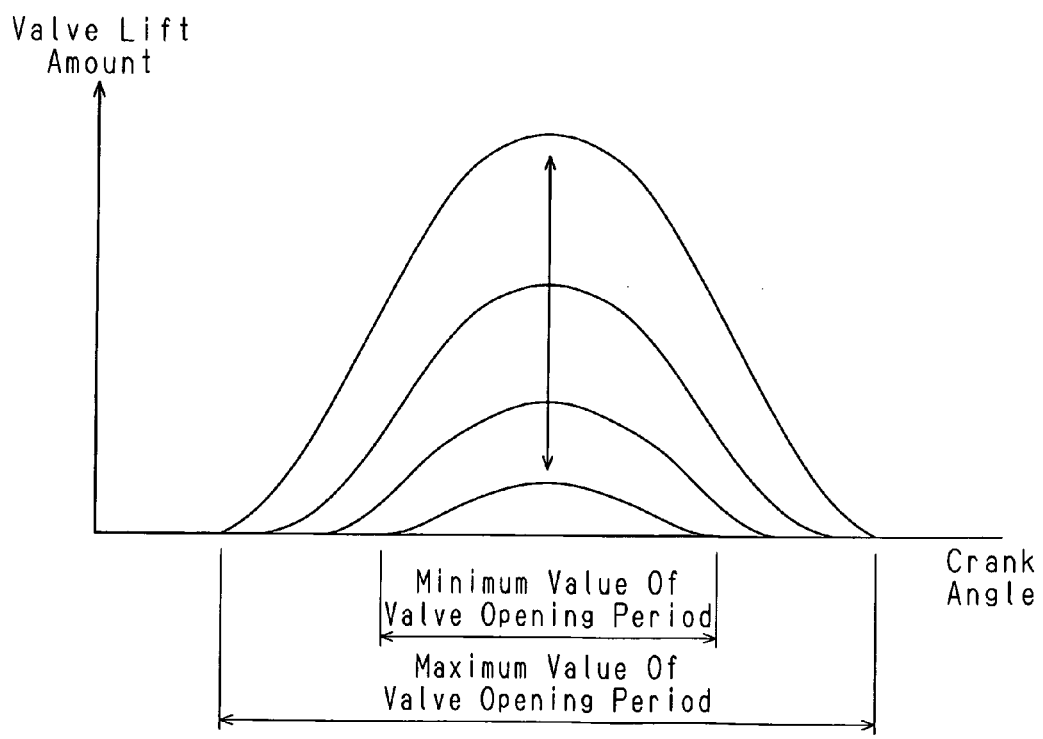
FIG. 14 is a graph showing changes in the maximum lift amount and a valve opening period of an intake valve by a variable valve actuation mechanism.

For example, the present invention may be applied to an output control device for an internal combustion engine 100 including air amount adjustment means shown in FIG. 13. The air amount adjustment means, such as shown in FIG. 13 includes a variable valve actuation mechanism 103 serving as an air amount adjustment means for adjusting the intake air amount, between an intake camshaft 101 and an intake valve 102. As shown in FIG. 14, the variable valve actuation mechanism 103 is a mechanism that changes the maximum lift amount and a valve opening period of the intake valve 102. The intake air amount increases when the maximum lift amount and the valve opening increase. If the air amount adjustment means includes the variable valve actuation mechanism 103, a target value of a valve characteristic having the maximum lift amount and the valve opening period correspond to the target throttle opening degree TAp. Even when the air amount adjustment means includes the variable valve actuation mechanism 103 that adjusts the intake air amount by changing at least one of the maximum lift amount and the valve opening period of the intake valve, the present invention may be applied.

The invention claimed is:

1. An output control device for an internal combustion engine that is mounted in a vehicle including an automatic transmission and includes air amount adjustment means for adjusting an intake air amount, the output control device calculating a target output torque of the internal combustion engine based on a manipulation amount of an accelerator pedal, a vehicle speed, and a state of a transmission gear ratio of the automatic transmission, and calculating a target actuation amount of the air amount adjustment means based on the calculated target output torque, wherein, when a current value of the transmission gear ratio of the automatic transmission is smaller than a predetermined value and an increase in the manipulation amount of the accelerator pedal is smaller than a specified value, the target actuation amount calculated based on the target output torque is limited to be less than or equal to a preset upper limit, wherein, if the increase in the manipulation amount of the accelerator pedal is greater than or equal to the specified value, the target actuation amount is set to a maximum actuation amount of the air amount adjustment means.

2. The output control device for the internal combustion engine according to claim 1, wherein the upper limit is set such that an output torque of the internal combustion engine is reduced by as much as a predetermined ratio with respect to the maximum output torque according to the rotational speed of the internal combustion engine.

3. The output control device for an internal combustion engine according to claim 2, wherein the output torque of the internal combustion engine reduced by as much as the predetermined ratio is an output torque in a transitional region through which the output torque shifts from a region in which a change amount of the output torque relative to a change amount of the actuation amount is large to a region in which a change amount of the output torque relative to a change amount of the actuation amount is small.

4. The output control device for an internal combustion engine according to claim 2, wherein the air amount adjustment means is a throttle valve provided on an intake passage of the internal combustion engine.

5. The output control device for an internal combustion engine according to claim 1, wherein the air amount adjustment means is a variable valve actuation mechanism that adjusts the intake air amount by changing at least one of a maximum lift amount and a valve opening period of an intake valve of the internal combustion engine.

6. An output control device for an internal combustion engine that is mounted in a vehicle including an automatic transmission and includes air amount adjustment means for adjusting an intake air amount, the output control device calculating a target output torque of the internal combustion engine based on a manipulation amount of an accelerator pedal, a vehicle speed, and a state of a transmission gear ratio of the automatic transmission, and calculating a target actuation amount of the air amount adjustment means based on the calculated target output torque, wherein, when a current value of the transmission gear ratio of the automatic transmission is smaller than a predetermined value and an increase in the manipulation amount of the accelerator pedal is smaller than a specified value, the target actuation amount calculated based on the target output torque is limited to be less than or equal to a preset upper limit, wherein, if the increase in the manipulation amount of the accelerator pedal is greater than or equal to the specified value, the target actuation amount is set based on the target output torque, and wherein, if the increase in the manipulation amount of the accelerator pedal is greater than or equal to the specified value and a degree of separation between a maximum output torque according to a rotational speed of the internal combustion engine and the target output torque is smaller than a predetermined value, the target actuation amount is set to a maximum actuation amount of the air amount adjustment means.

* * * * *